S. W. MATHER.
FUNERAL CAR.
APPLICATION FILED SEPT. 10, 1909.
951,193.
Patented Mar. 8, 1910.
2 SHEETS—SHEET 1.
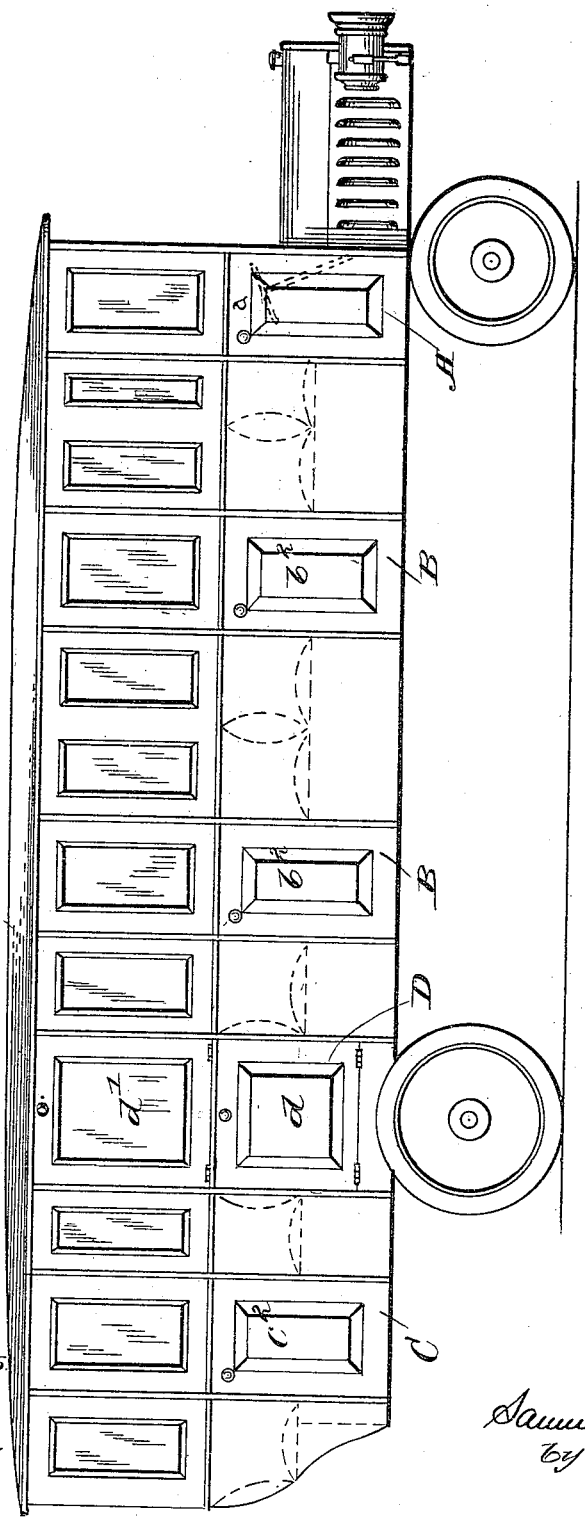

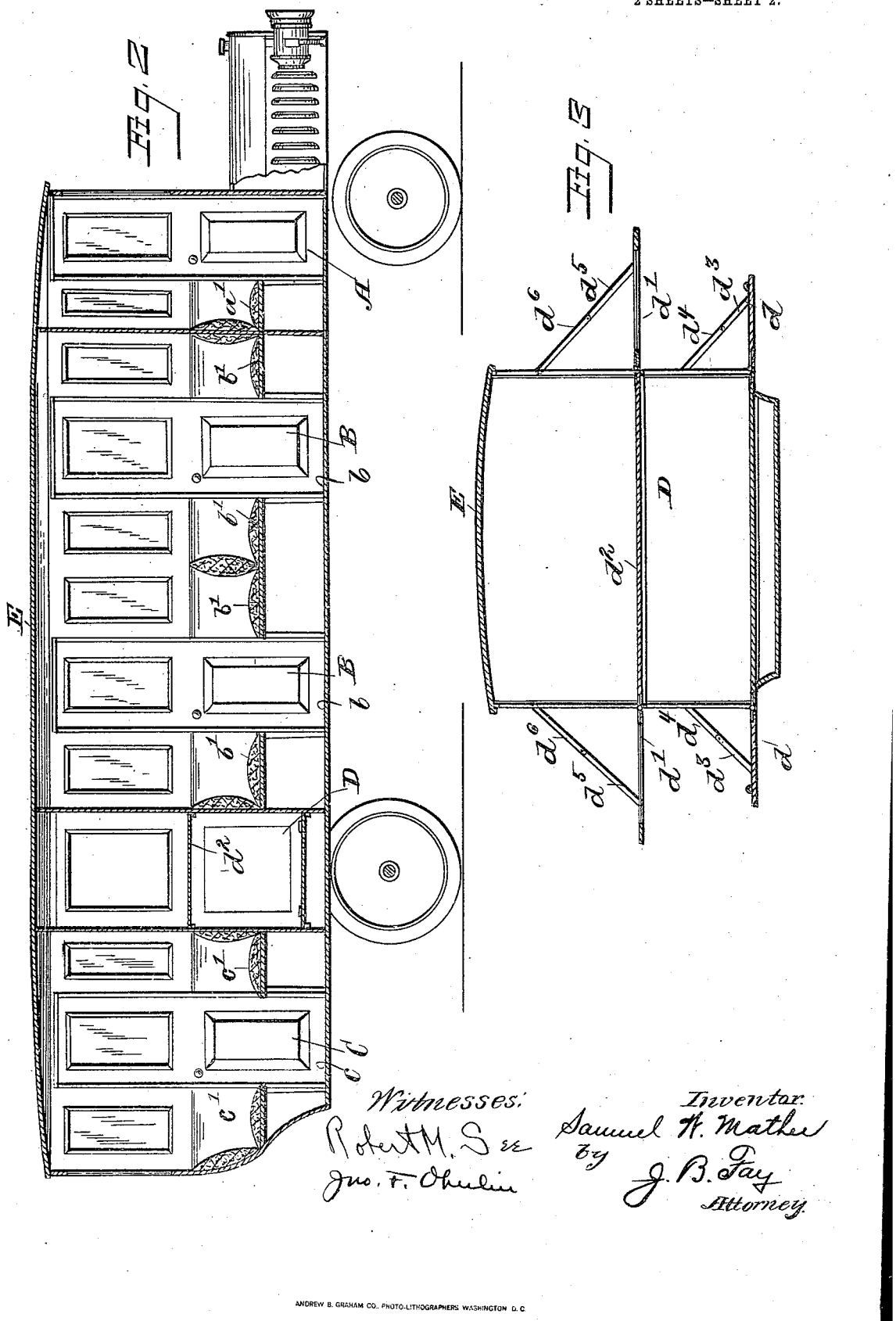

UNITED STATES PATENT OFFICE.

SAMUEL W. MATHER, OF CLEVELAND, OHIO.

FUNERAL-CAR.

951,193.  Specification of Letters Patent.  Patented Mar. 8, 1910.

Application filed September 10, 1909. Serial No. 517,158.

*To all whom it may concern:*

Be it known that I, SAMUEL W. MATHER, a citizen of the United States, and a resident of Cleveland, county of Cuyahoga, and State of Ohio, have invented a new and useful Improvement in Funeral-Cars, of which the following is a specification, the principle of the invention being herein explained and the best mode in which I have contemplated applying that principle, so as to distinguish it from other inventions.

My invention has for its object the provision of an improved body for automobile funeral cars.

The particular purpose of the invention is the provision of a limousine body in which the immediate mourners and the pallbearers may be carried, and also the provision of a compartment in which the casket may be conveniently carried.

To the accomplishment of this and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of a body embodying my invention, the support for the body being diagrammatically represented by two wheels; Fig. 2, is a longitudinal vertical section of the body; Fig. 3 is a transverse vertical section through the casket compartment.

The body in general comprises a limousine body E. In the front of the body is provided a compartment A for the driver, this compartment having a side entrance $a$. Immediately to the rear of the driver's compartment A, is a passenger compartment B. This compartment is provided with two sets of transverse seats $b^1$, the seats in a set facing each other. Between the seats of each set extends a transverse aisle $b$, there being two of these aisles. Opening into each of these transverse aisles $b$ is an entrance $b^2$. Immediately to the rear of the passenger compartment B is a transverse casket compartment D, and to the rear of the casket compartment is a second passenger compartment C provided with two transverse seats $c^1$ and transverse aisle $c$ between the seats, and an entrance $c^2$ into the aisle. The casket compartment D is preferably arranged so that in the assembled car it will extend transversely substantially over the rear axle. The compartment is provided with a horizontally hinged downwardly swinging door $d$, this door when closed reaching only approximately one half way to the roof of the car. Substantially at the level of the top of the door $d$ when closed, is a shelf $d^2$. This shelf is slidable transversely, and may be removed entirely if desired. Adjacent to the outer end of the shelf $d^2$, is a second horizontally hinged, downwardly swinging door $d^1$, adapted when closed to reach from the top of the first door to the top of the body. These similar swinging doors are hinged to the body of the car. Pivoted laterally to the lower door are two arms $d^3$; pivoted to the sides of the casket compartment are two arms $d^4$ having their outer ends pivoted to the arms $d^3$. Similar arms $d^5$ and $d^6$ connect the upper of the swinging doors with the compartment walls.

From this brief description the several advantages of my improved vehicle body are readily apparent. The passenger compartments afford plenty of room for the immediate mourners and for the pallbearers, these compartments being readily accessible by the side doors and the transverse aisles. The casket compartment is amply supported by being disposed over the rear axle. The lower swinging door may be opened and lowered into its horizontal position where it will be supported by the pivoted arms. The door then serves as a projecting shelf or table, and will preferably have upon its then upper surface, a fixed roller. This projecting table with its roller will render the placing of the casket in its compartment an easy matter. The slidable shelf which horizontally divides the casket compartment into two superposed compartments, may serve as a shelf upon which the flowers may be placed in transit, the upper swinging door serving as a shelf to permit of easy access to the flowers. The slidable shelf itself may be removed with the flowers thereon, or a small wheeled table may carry the flowers and be rolled in upon the shelf.

It will, of course, be understood that my invention contemplates entrances to the several compartments on one side only, or similar entrances on both sides of the body, as desired.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A body for a funeral car, comprising a driver's compartment, two passenger compartments, a transverse casket compartment located between the passenger compartments, and a side entrance into each compartment.

2. A body for a funeral car, comprising a driver's compartment, two passenger compartments, transverse seats in the passenger compartments, a transverse casket compartment located between the passenger compartments, and a side entrance into each compartment.

3. A body for a funeral car, comprising a driver's compartment, a side entrance thereto, a passenger compartment adjacent to the driver's compartment, transverse seats in the passenger compartment, transverse aisles between certain of said seats, a side entrance to each of said transverse aisles, a second passenger compartment, transverse seats therein, a transverse aisle between said seats, a side entrance to said aisle, a transverse casket compartment located between the two passenger compartments, and a side entrance thereto.

4. In an auto funeral car, the combination of a driver's compartment, a side entrance thereto, a passenger compartment adjacent to the driver's compartment, transverse seats in the passenger compartment, transverse aisles between certain of said seats, a side entrance to each of said transverse aisles, a second passenger compartment, transverse seats therein, a transverse aisle between said seats, a side entrance to said aisle, a transverse casket compartment located between the two passenger compartments, said casket compartment being disposed substantially above the rear axle of said car, and a side entrance to the casket compartment.

5. A body for a funeral car, comprising a driver's compartment, two passenger compartments, side entrances to said compartments, a transverse casket compartment located between the passenger compartments, and a horizontally hinged side door to the casket compartment.

6. A body for a funeral car, comprising a driver's compartment, two passenger compartments, side entrances to said compartments, a transverse casket compartment located between the passenger compartments, a horizontally hinged side door to the casket compartment, and means for retaining said door in a horizontal position when in open position.

7. A body for a funeral car, comprising a driver's compartment, two passenger compartments, side entrances to said compartments, a transverse casket compartment located between the passenger compartments, a horizontally hinged downwardly swinging door to the casket compartment, arms laterally pivoted to said door, and arms pivoted to the walls of the casket compartment and to said first arms respectively.

8. A body for a funeral car, comprising a driver's compartment, two passenger compartments, side entrances to said compartments, a transverse casket compartment located between the passenger compartments, a transversely slidable shelf dividing the casket compartment into two compartments, one above the other, a downwardly swinging door horizontally hinged at the bottom of said compartment, arms laterally pivoted to said door, arms pivoted to the walls of the compartment and to said first arms, respectively, said door when closed reaching only to said shelf, a second downwardly swinging door horizontally hinged to the body adjacent to the end of said shelf, arms laterally pivoted to said door, and arms pivoted to the walls of the compartment and to said first arms respectively.

Signed by me this 7th day of September, 1909.

SAMUEL W. MATHER.

Attested by—
ROBERT H. SEE,
JNO. F. OERLIN.